(12) United States Patent
Greber

(10) Patent No.: US 9,624,802 B2
(45) Date of Patent: *Apr. 18, 2017

(54) DEVICE FOR GENERATING AMMONIA

(71) Applicant: Faurecia Systemes D'Echappement, Nanterre (FR)

(72) Inventor: Frederic Greber, Ecot (FR)

(73) Assignee: Faurecia Systemes D'Echappement, Nanterre (FR)

( * ) Notice: Subject to any disclaimer, the term of this patent is extended or adjusted under 35 U.S.C. 154(b) by 405 days.

This patent is subject to a terminal disclaimer.

(21) Appl. No.: 13/909,131

(22) Filed: Jun. 4, 2013

(65) Prior Publication Data

US 2013/0327022 A1 Dec. 12, 2013

(30) Foreign Application Priority Data

Jun. 6, 2012 (FR) ...................................... 12 55273

(51) Int. Cl.
*F01N 3/08* (2006.01)
*F01N 3/20* (2006.01)
*F24H 1/20* (2006.01)
*F24H 9/20* (2006.01)

(52) U.S. Cl.
CPC ......... *F01N 3/0807* (2013.01); *F01N 3/2066* (2013.01); *F01N 2610/02* (2013.01); *F01N 2610/06* (2013.01); *F01N 2610/10* (2013.01); *F01N 2610/107* (2013.01); *F01N 2610/1406* (2013.01); *F24H 1/201* (2013.01); *F24H 9/2021* (2013.01); *Y02T 10/24* (2013.01); *Y10T 29/49345* (2015.01)

(58) Field of Classification Search
CPC .... F01N 3/0807; F01N 3/2066; F24H 9/2021; F24H 1/201
See application file for complete search history.

(56) References Cited

U.S. PATENT DOCUMENTS 2,989,383 A * 6/1961 Miller .................... B01D 15/00
165/163
2010/0021780 A1* 1/2010 Johannessen et al. .......... 429/19

FOREIGN PATENT DOCUMENTS

| DE | 102008002338 A1 | 12/2009 |
| DE | 2009047338 A1 | 6/2011 |
| EP | 1977817 A1 | 10/2008 |
| WO | 2011133752 A1 | 10/2011 |

OTHER PUBLICATIONS

FR Search Report from corresponding FR 12 55273, filed Jun. 6, 2012.

* cited by examiner

*Primary Examiner* — Thomas Denion
*Assistant Examiner* — Brandon Lee
(74) *Attorney, Agent, or Firm* — Carlson, Gaskey & Olds, PC

(57) ABSTRACT

An ammonia generating device for treating exhaust gases of internal combustion engines, notably of automobile vehicles, includes a reservoir having a body capable of releasing ammonia by desorption and a heating device positioned inside the reservoir to heat the body in the reservoir. The heating device comprises a heat generating element that has an elongated form. The heating device further includes at least one heat transfer feature laid out along an axial direction of the heat generating element and extending in a direction radial to the heat generating element.

22 Claims, 4 Drawing Sheets

DEVICE FOR GENERATING AMMONIA

TECHNICAL FIELD

The present invention relates to a device for generating ammonia for treating exhaust gases of internal combustion engines, notably of automobile vehicles, as well as to a method for regenerating this device and the use of such a device. The invention more particularly relates to an ammonia generating device comprising:
- a reservoir having a body capable of releasing ammonia by desorption;
- a heating device, positioned inside the reservoir to heat the body in the reservoir, the heating device comprising a heat generating element having an elongated shape; and
- a draining feature allowing discharge of the desorbed gas by the body.

BACKGROUND

Document DE 10 2009 047 338 describes a device for generating ammonia including a reservoir separated into two portions to form a first central reservoir connected to the exhaust line through control means for releasing ammonia, a metering valve here, and a second reservoir. The first central reservoir has a significantly smaller size than the second reservoir. Each reservoir includes a different ammonia storage element, each element allowing release of the reducing agent following a desorption reaction. The first central reservoir is completely positioned inside the second reservoir and is connected to the latter through a switching valve, such as an anti-return valve.

Further, a heat generating element is positioned inside the first central reservoir.

The first central reservoir and the second reservoir are thermally connected to each other, so that when the heat generating element is activated, heat is also transferred to the second reservoir.

This ammonia generating device has the goal of allowing sufficient resupply with a reducing agent, regardless of the operating state of the vehicle, while limiting the energy required for releasing the reducing agent contained in the storage elements present in the first central reservoir and the second reservoir, respectively.

Such an ammonia generating device is, however, complex to apply and may have uncertain operation notably when the heat produced by the heat generating element is insufficient for allowing the desorption reaction in the second reservoir, for example when the vehicle covers low mileage and when the duration of the powering up of the heat generating element is insufficient.

SUMMARY

The ammonia generating device according to the invention has the goal of providing a device which efficiently heats up the body contained in the reservoir, even when the heat generating element produces heat for a short time.

The ammonia generating device according to the invention also has the advantage of requiring a limited supply of energy and of being simple to apply.

An ammonia generating device of the aforementioned type includes a heating device that further comprises at least one heat transfer feature laid out along an axial direction of the heat generating element and extending in a direction radial to the heat generating element. The draining feature comprises a conduit extending inside each heat transfer feature, intended to collect the released gas following the desorption reaction.

According to other embodiments, the ammonia generating device may comprise one or several of the following features, taken individually or according to all technically possible combinations:
- each heat transfer feature may have a plate shape and may extend parallel to a longitudinal axis of the heat generating element;
- each heat transfer feature may extend over the whole length of the heat generating element;
- the device may comprise at least two heat transfer features, and the heat generating element may be substantially positioned in the center of the heating device;
- the draining feature may comprise a plurality of orifices connecting the conduit to the space of the reservoir surrounding the heat transfer feature;
- the body capable of releasing ammonia may be a solid element, for example a salt;
- the body capable of releasing ammonia may appear in the form of wafers for which the outer diameter has a shape mating an internal wall of the reservoir;
- the reservoir may be hermetic and may include a controlled path for releasing ammonia;
- the reservoir may have a substantially cylindrical shape and each heat transfer feature may have a plate shape, the width of which is substantially equal to a quarter of a diameter of the reservoir;
- the device may comprise an attachment feature ensuring that a position of each end of the heat generating element is maintained on walls of the reservoir;
- the attachment feature may form electric connectors allowing supply of electric power to the heat generating element.

The invention also relates to a method for regenerating a device according to the invention, wherein the method comprises an ammonia injection step aiming at resaturating with ammonia the body positioned inside the reservoir, the injected ammonia circulating in the draining feature or in circulation channels made in a wall of the reservoir.

Further, the regeneration method may comprise one or more of the following features, taken individually or according to all the technically possible combinations:
- the injected ammonia may be in liquid form;
- during regeneration of the device, the ammonia may circulate in a closed circuit between a discharge for discharging the ammonia from the reservoir and an injector for injecting ammonia into the reservoir;
- the ammonia used during the regeneration may have a temperature comprised between −17° C. and +10° C.

The invention also relates to the use of a device according to the invention for manufacturing an exhaust line for treating exhaust gases of internal combustion engines, notably of automobile vehicles.

These and other features may be best understood from the following drawings and specification.

BRIEF DESCRIPTION OF THE DRAWINGS

The invention will be better understood upon reading the description which follows only given as an example and made with reference to the appended drawings wherein.

DETAILED DESCRIPTION

Figure 1:
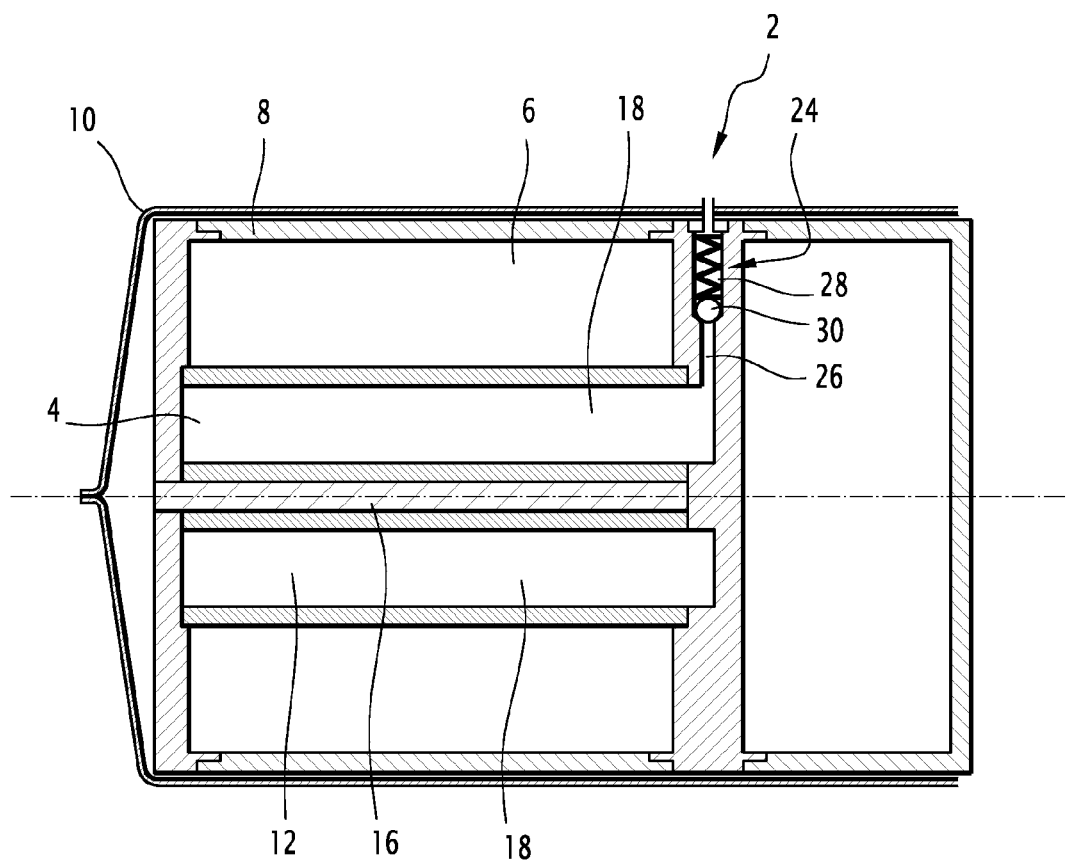
FIG. 1 illustrates a sectional view of an ammonia generating device according to a first embodiment.

FIG. 1 illustrates an ammonia generating device 2 according to the invention, capable of allowing the storage of an element which may release ammonia by desorption, inside which is positioned a heating device 4.

As this will be detailed subsequently, the heating device 4 is used for heating, for example, a salt saturated with ammonia 6 in order to allow release of ammonia gas following a desorption reaction. The released ammonia may then be used as a reducing agent for treating nitrogen oxides contained in the exhaust gases of internal combustion engines, notably of automobile vehicles.

The storage material allowing release of ammonia following a desorption reaction may correspond to one of the materials described in patent application WO 2008/077652. The material is for example selected from the group known as metal amine complexes, and having the general formula $M_a(NH_3)_nX_z$, wherein M is one or several cations selected from the group of alkaline metals such as Li, Na, K or Cs, earth alkaline metals such as Mg, Ca or Sr, and/or of transition metals such as V, Cr, Mn, Fe, Co, Ni, Cu, or Zn, or combinations of these metals such as NaAl, KAl, $K_2$Zn, CsCu, or $K_2$Fe, X being one or several anions selected from the group comprising fluorides, chlorides, bromides, iodides, nitrates, thiocyanates, sulfates, molybdates, phosphate ions, a being the number of cations per salt molecule, z being the number of anions per salt molecule and n being a coordination index comprised between 2 and 12. For example, the material making up the cartridge is Mg$(NH_3)_6Cl_2$, or Sr$(NH_3)_8Cl_2$ or further Ca$(NH_3)_8Cl_2$, or a mixture of these elements.

The ammonia generating device 2 comprises a hermetic reservoir 8 capable of allowing storage of the salt saturated with ammonia, the latter may, for example, appear in the form of a wafer. As illustrated in FIG. 1, the hermetic reservoir 8 has a substantially cylindrical shape and may preferably be made in plastic material in order to guarantee good thermal insulation. Preferably, each wafer has an outer diameter with a shape mating the internal wall of the reservoir.

Preferably, the ammonia generating device 2 further comprises an outer casing 10 inside which the hermetic reservoir 8 is positioned. This outer casing 10 is preferably made in metal.

The reservoir 8 and the outer casing 10 each comprise a holding feature, not shown, ensuring that the reservoir 8 is maintained in position inside the outer casing 10 to avoid any relative movement of the reservoir 8 inside the outer casing 10.

The heating device 4 comprises a heat generator 12 and a draining feature 14 to drain the released ammonia following the desorption reaction.

The heat generator 12 comprises a heat generating element 16 and at least one heat transfer feature or element 18.

The heat generating element 16 is connected to an electric power supply, not shown, such as a pair of conducting wires, allowing it to heat the salt saturated with ammonia 6 contained in the reservoir 8. Further, the heat generating element 16 may be connected to an electronic control unit (ECU) not shown, giving the possibility of controlling the electric powering up of the elements and thereby allowing release of ammonia.

As illustrated, the heat generating element 16 has an elongated shape, preferably a substantially cylindrical shape, and extends into the reservoir 8 so that its axis extends parallel to the longitudinal axis of the reservoir 8. Preferably, the axis of the heat generating element 16 coincides with the longitudinal axis of the reservoir 8.

In the illustrated example, the heat transfer features 18 are four in number. Each heat transfer feature comprises a plate and extends in a direction radial to the heat generating element.

Preferably, each heat transfer feature 18 extends over the whole length of the heat generating element 16.

Each heat transfer feature 18 extends parallel to the longitudinal axis of the heat generating element 16.

Preferably, each heat transfer feature 18 and the heat generating element 16 substantially have the same length as the reservoir 8.

Each heat transfer feature is comprised of a material having high heat conductivity. The selected material should however not oxidize in the presence of ammonia. The material making up each heat transfer feature may, for example, be aluminum which may notably be extruded.

The heat transfer features 18, four in number here, are regularly distributed all around the heat generating element 16. Thus, they are separated from each other by an angle of 90°.

Figure 2:
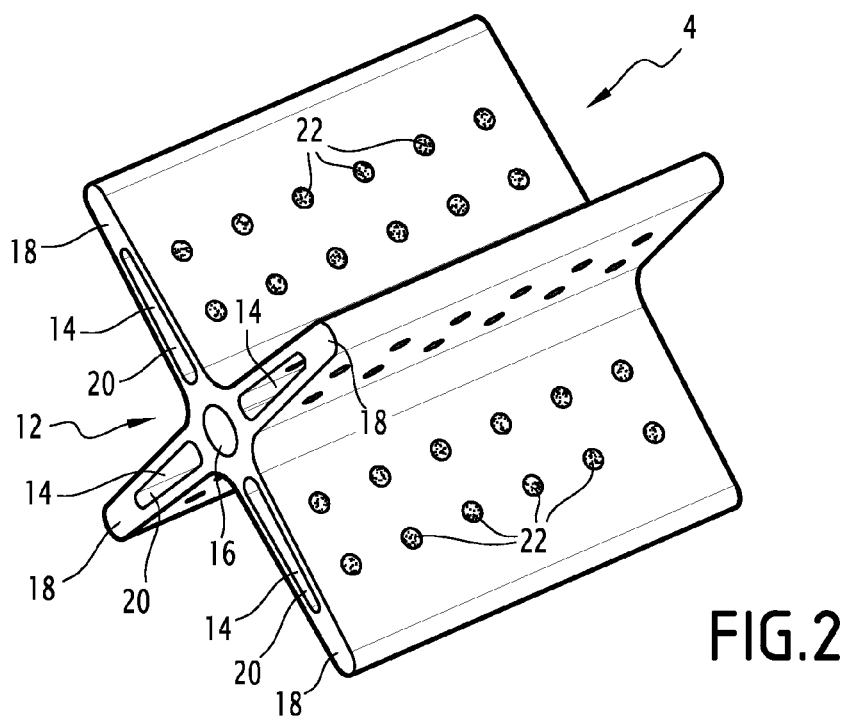
FIG. 2 illustrates a perspective view of a heating device intended to be positioned inside the ammonia generating device illustrated in FIG. 1.

In the exemplary embodiment illustrated in FIGS. 1 and 2, where the heat transfer features 18 are four in number, each heat transfer feature 18 substantially has a width equal to a quarter of the diameter of the reservoir.

Of course, according to the selected embodiment, the number of heat transfer features 18 may vary and may notably be comprised between two and six. The selection of this number may notably depend on the diameter of the reservoir 8.

Preferably, each heat transfer feature 18 substantially has the same dimensions. Thus, in the case when the number of heat transfer features 18 is greater than 2, the heat generating element 16 is preferably positioned in the center of the heat generator 12.

Each plate forming the heat transfer feature 18 comprises an inner conduit 20 intended to allow circulation of released ammonia gas following the desorption reaction and orifices 22 allowing connection of the inner conduit 20 to the space of the reservoir 8 surrounding the plate. These orifices 22 are regularly distributed along the plate and form, as this will be detailed subsequently, a path for circulation of ammonia, and notably a way for bringing the ammonia gas to the inner conduit 20 as well as a way for supplying ammonia to the salt contained in the reservoir 8.

The conduit 20 is obtained when the heat transfer feature is extruded, or by molding. Alternatively, it is machined, the conduit 20 is entirely empty.

Thus, the conduit 20 and the orifices 22 form the draining feature 14 for draining the released ammonia.

Further, the reservoir is provided with a controlled path for releasing the ammonia 24, formed by a channel 26 connected to the conduit 20, towards a path for diffusing the ammonia into the exhaust line of the vehicle, the path for releasing the ammonia being laid out to cross the outer casing 10.

Preferably, an anti-return valve 28 is positioned inside the channel 26.

In a preferred embodiment, the valve 28 notably comprises a ball 30 made up from a magnetic material. Thus, as this will be described more specifically, when an operator wishes to again re-saturate the salt with ammonia, it is possible to maintain the channel open by displacing the magnetic ball 30 by applying a magnet from the outside of the ammonia generating device 2 against the wall of the external casing 10 at right angles to the valve.

From this point, the operation of the ammonia generating device will be described.

As soon as the ECU detects a need for ammonia in order to treat the exhaust gases of an internal combustion engine, the ECU orders the electric powering up of the heat generating element 16.

The heat generated by the heat generating element 16 is diffused to the heat transfer features by the good conductivity of the material making up this element, and then to the salt saturated with ammonia 6 surrounding the heat generator 12. A desorption reaction is then triggered, generating the release of the ammonia contained in the salt, the latter is then desorbed from the salt.

The released ammonia is then free to circulate in the inner conduit(s) 20 via the orifices 22, and then into the channel 26 thereby allowing the outflow of ammonia gas from the reservoir 8 through the anti-return valve towards the exhaust line.

When it is no longer necessary to inject ammonia into the exhaust line of the vehicle for treating the exhaust gases of the latter, the ECU orders the stopping of the electric powering up of the heat generating element 16, the result is rapid stopping of the production of ammonia, the desorption reaction only occurring under the effect of heat.

Advantageously, the ammonia generating device 2 has the advantage of being able to be reloaded with ammonia one or several times, as soon as the ammonia amount retained in the salt positioned in the reservoir 8 is no longer sufficient.

For this purpose, when it is desired to again re-saturate the salt present in the reservoir 8, a magnet is placed against the wall of the external casing 10 at right angles to the valve 28 in order to displace the ball 30 made in magnetic material and allow introduction of ammonia into the channel 26, the latter being open following displacement of the ball 30. The ammonia introduced into the channel 26 by the injector, not shown, is preferably in liquid form and has a low temperature, preferably comprised between −17° C. and +10° C. The ammonia may then re-saturate the salt present in the reservoir 8, by circulating through the inner conduit 20 and the orifices 22 of each heat transfer feature 18.

The ammonia adsorption reaction by the salt is an exothermic reaction; the adsorption reaction is blocked as soon as the temperature within the salt attains a threshold value.

The injection of liquid ammonia at low temperature during the regeneration method has the advantage of permanently cooling the salt which has to adsorb the ammonia. With this cooling, it is thus possible to limit the heat produced during adsorption and therefore increase the amount of ammonia trapped in the salt.

The excess of liquid ammonia may be discharged by a discharger provided for this purpose. It is then possible to establish a circulation of ammonia in a closed circuit between the discharger and the injector allowing injection of ammonia into the reservoir, such a circulation further allows improvement in the cooling of the device which is favorable as indicated above for adsorption of ammonia.

Figure 3:
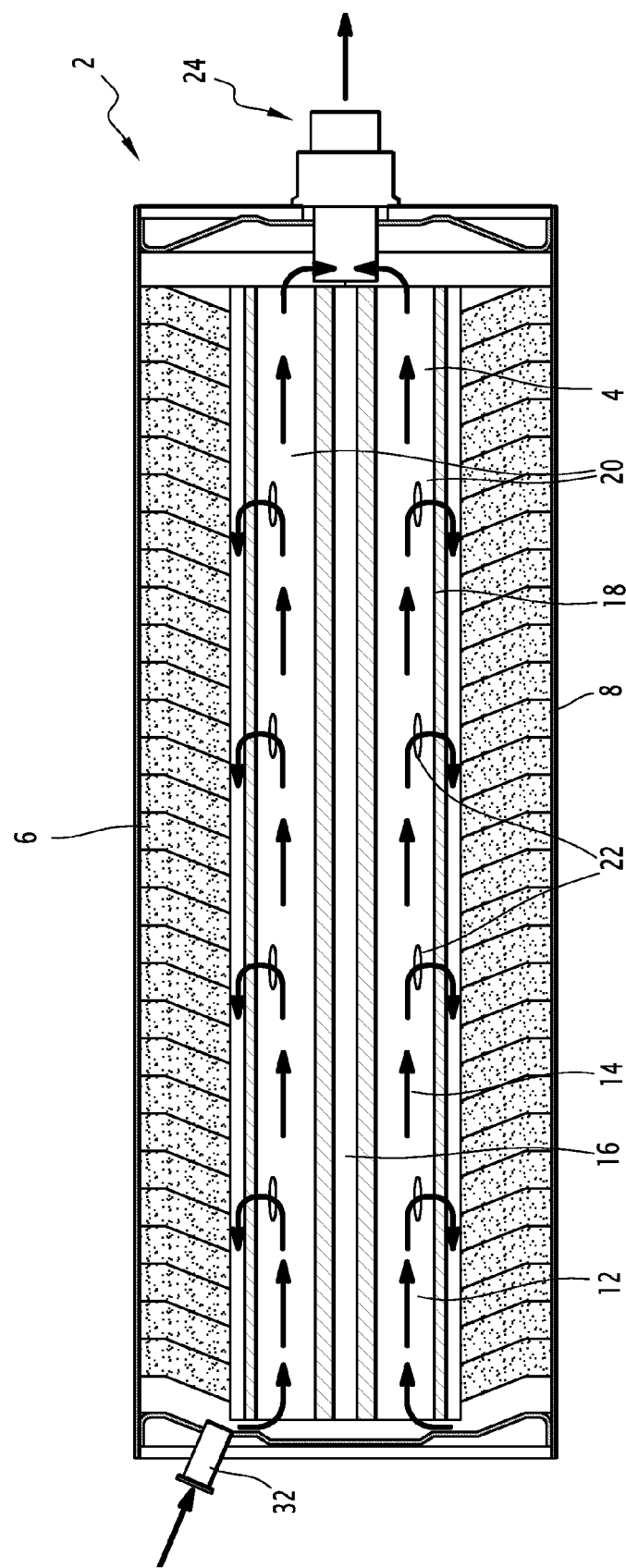
FIG. 3 illustrates a sectional view of an ammonia generating device according to a second embodiment during a step for filling up the latter.

According to the alternative embodiment illustrated in FIG. 3, the ammonia discharge may be achieved through a controlled path for releasing ammonia 24, the path for filling up the reservoir with ammonia is then formed by a distinct supply channel 32.

Figure 4:
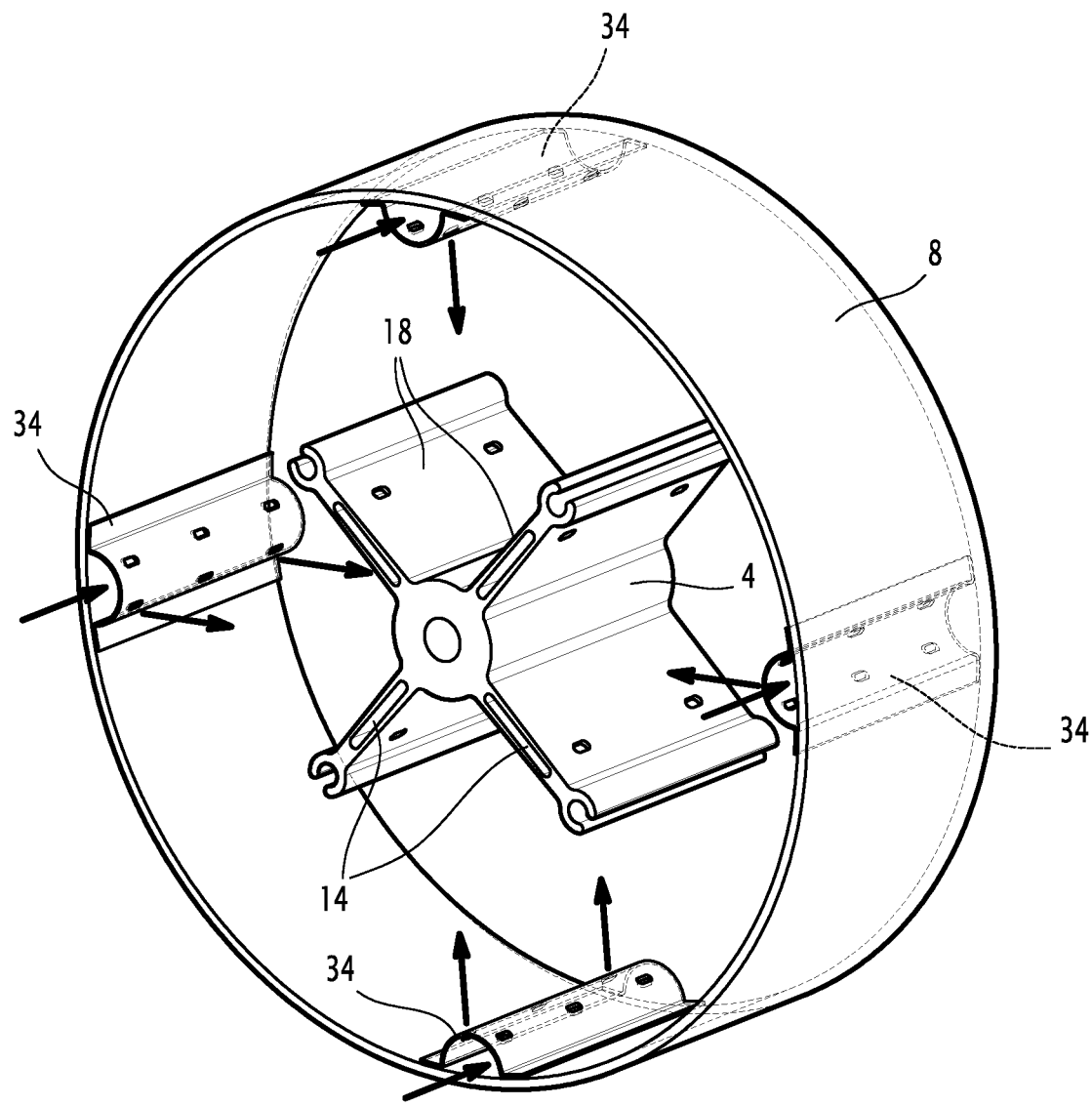
FIG. 4 illustrates a partial perspective view of an ammonia generating device according to a third embodiment.

According to the alternative embodiment illustrated in FIG. 4, the wall of the reservoir 8 may also be adapted in order to bring liquid ammonia within the salt. For this purpose, the wall may comprise perforated circulation channels 34, here four in number, communicating with the liquid ammonia inlet in order to allow circulation of ammonia in the salt and to resaturate the latter. The liquid ammonia excess is discharged by the draining feature 14.

Figure 5:
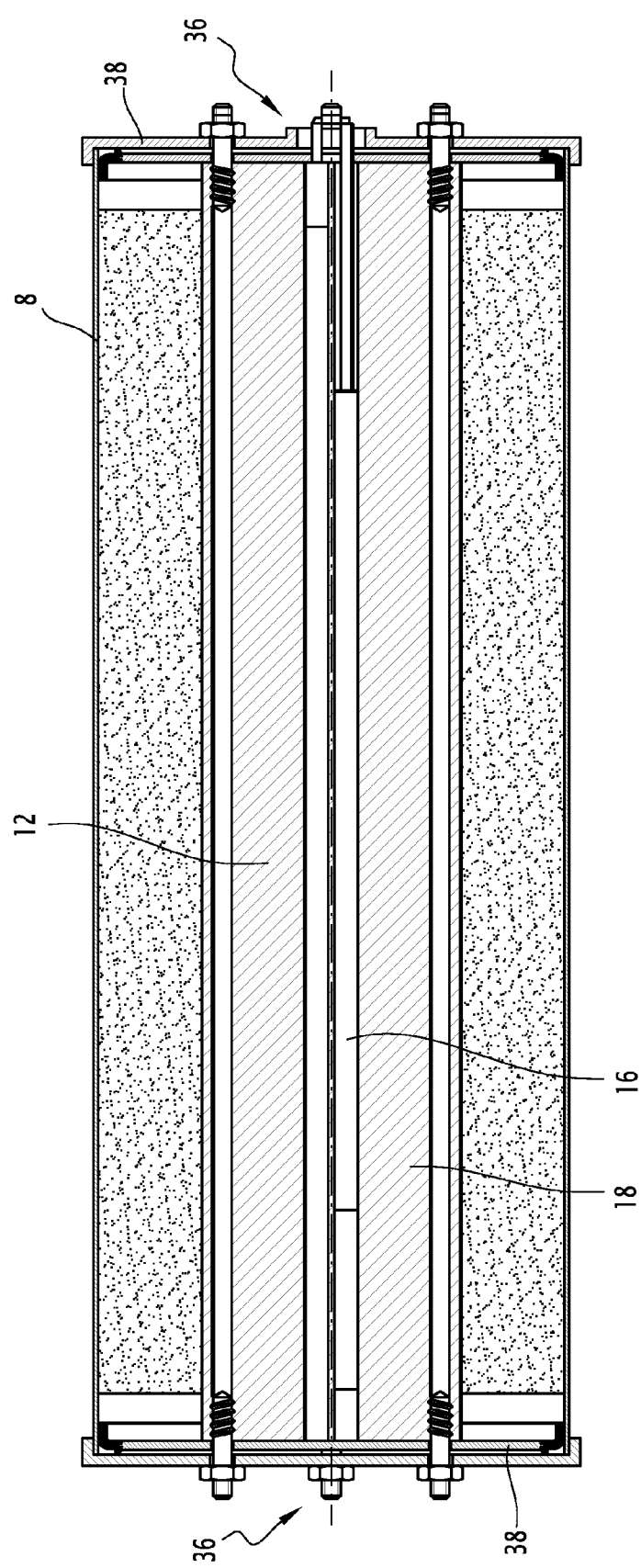
FIG. 5 illustrates a sectional view of an ammonia generating device according to a fourth embodiment.

Further, as illustrated in FIG. 5, the ammonia generating device may be provided with an attachment feature 36 ensuring that each end of the heat generating element 16 is maintained on closing cups 38 of the hermetic reservoir 8 positioned at each of its side ends. These attachment feature 36 conventionally comprises a lug stud/nut assembly intended to cooperate with the heat generating element 16. These attachment features 36 have the advantage of forcing the salt wafers positioned inside the reservoir to form a compact assembly. In this exemplary embodiment, the reservoir is made in metal and the outer casing is made in an insulting material, preferably in plastic material. Further, these attachment features 36 form electric connectors allowing electric powering of the heat generating element 16. In this exemplary embodiment, the seal between the closing cups 38 and the side wall of the reservoir is achieved by way of a sealing feature of the gasket type.

Such a generating device is simple to apply and has limited costs.

The generating device according to the invention has the advantage of allowing rapid heating of the whole of the salt contained in the reservoir and thus allows sufficient release of ammonia while limiting the required provision of energy. The rapidity of the heating notably depends on the number of heat transfer features of the heating device and on the dimensions of the latter.

Further, the generating device according to the invention gives the possibility of draining the released ammonia and of efficiently bringing it to the path for diffusing ammonia into the exhaust line of the vehicle.

Further, as this was described earlier, the ammonia generating device according to the invention has the advantage of being able to be easily regenerated notably without disassembling the ammonia generating device with which the vehicle is equipped, in the case when the device is accessible from the outside of the vehicle. This has the advantage of simplifying the handling of the spare parts at a dealer's.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An ammonia generating device for treating exhaust gases of internal combustion engines of automobile vehicles, comprising:
   a reservoir having a body capable of releasing ammonia by desorption;

a heating device positioned inside the reservoir to heat the body in the reservoir, the heating device comprising a heater having an elongated shape;
a draining feature allowing discharge of the desorbed ammonia by the body; and
wherein the heating device further comprises at least one heat transfer element laid out along an axial direction of the heater and extending in a direction radial to the heater, and in that the draining feature comprises a conduit that is an empty duct extending inside each heat transfer element and is intended for collecting released gas following the desorption reaction, and wherein the at least one conduit is straight and is open at an axial end.

2. The device according to claim 1, wherein each heat transfer element has a plate shape and extends parallel to a longitudinal axis of the heater.

3. The device according to claim 1, wherein each heat transfer element extends over a whole length of the heater.

4. The device according to claim 1, wherein the at least one heat transfer element comprises at least first and second heat transfer elements and in that the heater is positioned in a center of the heating device.

5. The device according to claim 1, wherein the draining feature comprises a plurality of orifices connecting the conduit to a space of the reservoir surrounding the heat transfer feature.

6. The device according to claim 1, wherein the body capable of releasing ammonia is a solid element comprising a salt.

7. The device according to claim 6, wherein the body capable of releasing ammonia appears in the form of wafers, an outer diameter of which has a shape mating an internal wall of the reservoir.

8. The device according to claim 1, wherein the reservoir is hermetic and includes a controlled path for releasing ammonia.

9. The device according to claim 1, wherein the reservoir has a cylindrical shape defined by a diameter and in that each heat transfer element has a plate shape, the width of which is equal to one quarter of the diameter of the reservoir.

10. The device according to claim 1, wherein including an attachment feature ensuring that each end of the heater is maintained in position on walls of the reservoir.

11. The device according to claim 10, wherein the attachment feature forms electric connectors allowing electric powering of the heater.

12. The device according to claim 1, wherein the outer casing defines a central axis, and wherein the at least one conduit has a constant cross-section in a direction along the central axis.

13. A method for regenerating an ammonia generating device comprising a reservoir having a body capable of releasing ammonia by desorption, a heating device positioned inside the reservoir to heat the body in the reservoir, the heating device comprising a heater having an elongated shape, a draining feature allowing discharge of the desorbed ammonia by the body, and wherein the heating device further comprises at least one heat transfer element laid out along an axial direction of the heater and extending in a direction radial to the heater, and in that the draining feature comprises a conduit that is an empty duct extending inside each heat transfer element and is intended for collecting released gas following the desorption reaction, and wherein the at least one conduit is straight and is open at an axial end, the method comprising:

injecting ammonia aimed at re-saturating with ammonia the body positioned inside the reservoir, the injected ammonia circulating in the draining feature or in circulation channels arranged in a wall of the reservoir.

14. The method according to claim 13, wherein the injected ammonia is in liquid form.

15. The method according to claim 13, wherein during regeneration of the ammonia generating device, the ammonia circulates in a closed circuit between a discharger for discharging the ammonia from the reservoir and an injector for injecting the ammonia into the reservoir.

16. The method according to claim 13, wherein the ammonia used during regeneration has a temperature comprised between $-17°$ C. and $+10°$ C.

17. A method for manufacturing an exhaust line for treating the exhaust gases of internal combustion engines, notably of automobile vehicles, comprising:
installing an ammonia generating device in a vehicle exhaust line, the ammonia generating device comprising a reservoir having a body capable of releasing ammonia by desorption, a heating device positioned inside the reservoir to heat the body in the reservoir, the heating device comprising a heater having an elongated shape, a draining feature allowing discharge of the desorbed ammonia by the body, and wherein the heating device further comprises at least one heat transfer element laid out along an axial direction of the heater and extending in a direction radial to the heater, and in that the draining feature comprises a conduit that is an empty duct extending inside each heat transfer element and is intended for collecting released gas following the desorption reaction, and wherein the at least one conduit is straight and is open at an axial end.

18. The method according to claim 13, wherein the outer casing defines a central axis, and wherein the at least one conduit has a constant cross-section in a direction along the central axis.

19. The method according to claim 17, wherein the outer casing defines a central axis, and wherein the at least one conduit has a constant cross-section in a direction along the central axis.

20. An ammonia generating device to treat exhaust gases of internal combustion engines of automobile vehicles, comprising:
a reservoir having a body capable of releasing ammonia by desorption;
a heating device positioned inside the reservoir to heat the body in the reservoir, the heating device comprising a heat generator having an elongated shape;
a drain allowing discharge of the desorbed ammonia by the body; and
wherein the heating device further comprises at least one heat transfer element laid out along an axial direction of the heat generator and extending in a direction radial to the heat generator, and wherein each heat transfer element comprises a plate having an external surface and an open internal conduit defined by an internal surface of the plate, and wherein the drain comprises the open internal conduit extending inside each heat transfer element to form a drain path for released gas following the desorption reaction, wherein the at least one conduit is straight and is open at an axial end.

21. The device according to claim 20, wherein at least one heat transfer element comprises a plurality of heat transfer elements that each include an open internal conduit, and wherein the open internal conduits extend along an entire length of each respective plate such that the drain path comprises a straight drain path extending from one end face of the plate to an opposite end face of the plate.

22. The device according to claim 21, wherein each heat transfer plate includes a plurality of orifices that are formed on the external surface of the heat transfer plate and are in fluid communication with the open internal conduit.

\* \* \* \* \*

UNITED STATES PATENT AND TRADEMARK OFFICE
CERTIFICATE OF CORRECTION

PATENT NO.        : 9,624,802 B2
APPLICATION NO.   : 13/909131
DATED             : April 18, 2017
INVENTOR(S)       : Frederic Greber It is certified that error appears in the above-identified patent and that said Letters Patent is hereby corrected as shown below:

In the Claims

In Claim 1, Column 7, Line 9; after "comprises" replace "a" with --at least one--

In Claim 5, Column 7, Line 27; after "transfer" replace "feature" with --element--

In Claim 12, Column 7, Line 48; after "wherein" replace "the" with --an--

In Claim 13, Column 7, Line 62; after "comprises" replace "a" with --at least one--

In Claim 17, Column 8, Line 16; before "exhaust gases" delete "the"

In Claim 17, Column 8, Line 29; after "comprises" replace "a" with --at least one--

In Claim 18, Column 8, Line 34; after "wherein" replace "the" with --an--

In Claim 19, Column 8, Line 38; after "wherein" replace "the" with --an--

In Claim 20, Column 8, Line 57; before "open internal" replace "an" with --at least one--

In Claim 20, Column 8, Line 62; before "conduit" insert --open internal--

Signed and Sealed this
Seventeenth Day of October, 2017

Joseph Matal
*Performing the Functions and Duties of the
Under Secretary of Commerce for Intellectual Property and
Director of the United States Patent and Trademark Office*